(12) United States Patent
Bisgaard

(10) Patent No.: US 7,938,017 B2
(45) Date of Patent: May 10, 2011

(54) TEST BENCH AND A METHOD FOR TESTING WIND TURBINE EQUIPMENT

(75) Inventor: Jan Bisgaard, Viborg (DK)

(73) Assignee: Vestas Wind Systems A/S (DK)

( * ) Notice: Subject to any disclaimer, the term of this patent is extended or adjusted under 35 U.S.C. 154(b) by 104 days.

(21) Appl. No.: 12/348,219

(22) Filed: Jan. 2, 2009

(65) Prior Publication Data

US 2009/0107255 A1 Apr. 30, 2009

Related U.S. Application Data

(63) Continuation of application No. PCT/DK2007/000333, filed on Jul. 3, 2007.

(30) Foreign Application Priority Data

Jul. 3, 2006 (DK) ................................ 2006 00911

(51) Int. Cl.
*G01N 3/02* (2006.01)
(52) U.S. Cl. ........................................... 73/856
(58) Field of Classification Search ........................ None
See application file for complete search history.

(56) References Cited

U.S. PATENT DOCUMENTS

| | | | | |
|---|---|---|---|---|
| 5,412,997 | A * | 5/1995 | Hu et al. | 73/827 |
| 5,753,799 | A * | 5/1998 | Shah | 73/40 |
| 6,862,940 | B2 * | 3/2005 | Romano | 73/856 |
| 7,178,406 | B2 * | 2/2007 | Gonzalez et al. | 73/856 |
| 7,819,019 | B2 * | 10/2010 | Bisgaard | 73/856 |
| 2009/0107256 | A1 * | 4/2009 | Jensen | 73/862 |
| 2009/0173148 | A1 * | 7/2009 | Jensen | 73/116.03 |

FOREIGN PATENT DOCUMENTS

| | | |
|---|---|---|
| DE | 3818661 A1 | 12/1988 |
| DE | 4328537 A1 | 3/1995 |
| EP | 1564405 A1 | 8/2005 |
| JP | 03238376 | 10/1991 |
| WO | 2004/005879 A1 | 1/2004 |

OTHER PUBLICATIONS

National Renewable Energy Laboratory; "Wind Turbine Testing in the NREL Dynamometer Test Bed"; Presented at AWEA's Wind Power 2000 Conference in California, Apr. 30-May 4, 2000; 12 pages.
The International Search Report and the Written Opinion of the International Searching Authority, Nov. 21, 2007, (10 pages).

* cited by examiner

*Primary Examiner* — Andre J Allen
(74) *Attorney, Agent, or Firm* — St. Onge Steward Johnston & Reens LLC

(57) ABSTRACT

The invention relates to a test bench for testing wind turbine equipment. The test bench comprises one or more load applying means directly and/or indirectly applying load to the equipment, drive means of the test bench for rotating an input shaft of the equipment at least during a part of the test, and simulating means for establishing wind turbine like conditions or facilities. The invention further relates to a method for testing wind turbine equipment. The method comprises the steps of positioning the equipment in, on or at a test bench, rotating an input shaft of the equipment by drive means of the test bench, and directly and/or indirectly applying load to the equipment by means of load applying means of the test bench.

20 Claims, 8 Drawing Sheets

TEST BENCH AND A METHOD FOR TESTING WIND TURBINE EQUIPMENT

CROSS-REFERENCE TO RELATED APPLICATIONS

The present application is a continuation of pending International patent application PCT/DK2007/000333 filed on Jul. 3, 2007, which designates the United States and claims priority from Danish patent application PA 2006 00911 filed on Jul. 3, 2006, the content of which is incorporated herein by reference.

FIELD OF THE INVENTION

The invention relates to a test bench for testing wind turbine equipment and a method for testing wind turbine equipment.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Large modern wind turbines get bigger and bigger all the time and the different components of the wind turbine such as the gearbox, generator, braking system etc. do also get bigger. Furthermore, the technological development produces components and interaction between components which are more and more specialized and complex. This is of course advantageous regarding efficiency and output of the wind turbine but since these large wind turbines are expensive and breakdowns can be very costly it is important to ensure that the life, durability, quality, capacity etc. of the wind turbine components are well documented.

One way of doing this would be to gather information on exciting wind turbines and then base the maintenance program, the choice of components and so on, on a statistical analysis of these data. But this method is rather inefficient in that if the data reveals that a component with an expected life of 20 years only lasts an average of 7 years, the similar wind turbines produced in these 7 years will also contain the defective component, and the data can most often not disclose whether the component breaks down because of poor quality, if it has been mounted or used wrong or if several interacting factors causes the reduced life.

Another way of solving this problem is disclosed in European patent application No EP 1 564 405 A1. This application discloses a test bench for carrying out fatigue and load tests on the structural members of primarily the nacelle and the nacelle components. But testing the strength of the structural members of the nacelle has the main purpose of reducing the use of material or optimizing the design of these structural members, hereby reducing the cost and weight of the members and ensuring that they can withstand the loads that they are affected by during normal operation of the wind turbine. It will not provide helpful information regarding selection of components, the interaction of components and other which could prevent breakdowns and reduce the cost of the components.

It is therefore an object of the invention to provide for an advantageous and efficient technique for testing wind turbine equipment.

Especially, it is an object of the invention to provide for a technique for testing wind turbine equipment which offers more realistic load types.

SUMMARY OF THE INVENTION

The invention provides for a test bench for testing wind turbine equipment. The test bench comprises one or more load applying means directly and/or indirectly applying load to the equipment, drive means of the test bench for rotating an input shaft of the equipment at least during a part of the test, and simulating means for establishing wind turbine like conditions or facilities.

By rotating the input shaft of the equipment during the test and at the same time applying load to the input shaft, it is possible to simulate the loads acting on the equipment during normal operation of a wind turbine as well as extreme situations, hereby making it possible to compare different equipment under the same normal load conditions as well as performing accelerated life tests. This is advantageous, in that it hereby is possible to perform a more efficient test of the equipment, which enables that the load types and sizes dynamically adjusted e.g. to be substantially realistic if needed or to inflict overload if needed.

Furthermore, it is advantageous that the test bench further comprise simulating means for establishing wind turbine like conditions or facilities e.g. by enabling that wind turbine components can be tested while mounted in their real suspension structure, by enabling that the equipment can be tested in an angle corresponding to the angle under which it would normally operate in a wind turbine, by enabling that the equipment can be tested in a "life-like" environment regarding temperature, air-pressure, humidity or other, by enabling that the equipment can be tested while being exposed to vibrations or any other conditions, situations or facilities which would simulate or at least to some degree create wind turbine-like conditions, situations or facilities for the tested equipment, in that by establishing these wind turbine-like conditions or facilities the test bench is able to perform a more realistic and/or efficient test.

It should be emphasised that by the term "shaft", is to be understood any kind of bar, rod, pipe, tube, ring, coupling, sleeve, muff or other capable of transferring a rotation. The shaft is in no way limited to being solid but could also e.g. be a hollow ring or sleeve forming or attached to the planet carrier or annulus gear of the wind turbine gearbox.

In an aspect of the invention, said equipment are wind turbine drive train components such as main bearing, gearbox and generator, and wherein said generator being connected to a utility grid or utility grid simulating means.

The drive train components of the wind turbine does all comprise rotating parts and they are all most often placed in the nacelle making them very difficult and expensive to repair and replace. Furthermore the integration between the different drive train components, between the different drive train components and different control systems and software can be very complex and is of course an important issues regarding the efficiency of the wind turbine. It is therefore advantageous, that particularly the drive train components are tested on a test bench comprising means for both rotating the input shaft and apply load to the components.

In an aspect of the invention, said utility grid or utility grid simulating means being an indirect load applying mean of said test bench.

This is advantageous, in that by indirectly applying load to the equipment by connecting the generator to a utility grid or utility grid simulating means, it is possible to more accurately simulate the load situations of a real wind turbine or to perform accelerated life tests e.g. by establishing a permanent overload situation or varying load situations.

In an aspect of the invention, said utility grid simulating means comprise means for dynamically adjusting the grid voltage and the grid frequency.

By enabling dynamically adjustment of the grid voltage and the grid frequency during the test it is both possible to simulate normal operation conditions of the equipment as well as extreme or fault situations of the grid hereby facilitating a more efficient and/or realistic test.

In an aspect of the invention, said utility grid simulating means comprise a converter.

Making the utility grid simulating means comprise a converter is advantageous, in that a converter provides means for dynamically adjusting the different grid parameters hereby enabling a more efficient test.

In an aspect of the invention, said utility grid simulating means comprise means for testing if said equipment complies with different utility grid codes.

Utility grid codes are in principle different rules for how the wind turbine is to react on different deviations in the utility grid such as deviations in the voltage or frequency. These grid codes can be different from country to country or from region to region. It is therefore advantageous to provide the utility grid simulating means with the ability to test if the equipment acts in accordance with different utility grid codes, hereby testing that the tested equipment is efficient regarding the codes.

In an aspect of the invention, at least one of said one or more load applying means comprise means for applying axial and/or radial load to said input shaft.

The input shaft of the equipment will always—at least to some degree—be influenced by axially and/or radial directed forces during normal operation of the equipment in a real wind turbine. It is therefore advantageous to apply these loads during the test to produce a more efficient and/or realistic test.

In an aspect of the invention, said one or more load applying means comprise two or more radial load means for applying substantially radial load to said input shaft, said two or more radial load means being axially displaced.

By providing the input shaft of the tested equipment with two axially displaced radial load means, it is possible to inflict a more efficient and/or realistic load situation on the tested equipment. It would e.g. be possible to use one of the radial load means to simulate the substantially static force of gravity on the rotor 4 and use the other to simulate the torque originating from difference in the wind load at the top and bottom of the rotor, or to simulate dynamically or cyclically changing loads such as instability or the rotor or even vibrations originating from the blades 5 or possible pitch mechanism of the blades 5. Both radial load means could also inflict two different static loads (e.g. in different directions hereby inflicting torque on the equipment) or both radial load means could simulate different dynamically changing loads. This may in some form also be done by only one radial load mean but by using two, it is easier and simpler to simulate complex loads and load situations e.g. involving both static and dynamically loads.

In an aspect of the invention, said input shaft of said equipment is an input shaft of a wind turbine gearbox or an input shaft of a wind turbine generator.

The function of the gearbox and the generator of a wind turbine are essential to the efficiency of the wind turbine and since these components are very complex and expensive and since they most often are situated in the nacelle of the wind turbine where they are difficult to repair and replace it is advantageous to provide a test bench which is capable of rotating the input shaft of the gearbox and/or generator and at the same time apply load to these.

Again it should be emphasised that the term "shaft" in this connection is to be understood as any kind of mechanical connection capable of transferring rotation to the device such as any kind of mechanical connection on the wind turbine gearbox, generator or nacelle capable of being connected to a rotation device and transfer the rotation to the wind turbine gearbox, generator or nacelle.

In an aspect of the invention, said drive means is an electrical motor comprising a gearbox.

The rotation speed and particularly the torque of an electrical motor are easily controlled very accurately and by providing the motor with a gearbox it is possible to reduce the nominal rotation speed of the motor to a degree suitable for simulating the rotation speed of the rotor on a wind turbine. This is advantageous in that it hereby is possible to carry out a more efficient, accurate and/or realistic test of the wind turbine equipment.

In an aspect of the invention, said test bench is stationary.

A wind turbine test bench for testing equipment such as nacelles could easily weigh up to 500 metric ton, and it is therefore advantageous to make the test bench stationary.

In an aspect of the invention, said simulating means comprise climate controlling means for substantially controlling one or more climate parameters such as the temperature, humidity and air pressure of the surroundings of at least a part of said equipment.

The climate parameters are very important stress factors of an operating wind turbine and particularly very high or low temperatures or constant variations in the temperature can potentially be very damaging to the wind turbine equipment. By providing the test bench with climate controlling means it is possible to substantially control one or more of the climate parameters hereby enabling a more efficient and/or realistic test of the equipment. Among other things this would enable HALT (Highly Accelerated Life Testing or Highly Accelerated Limit Testing) of the equipment, which is a well known and very efficient way of testing and/or estimating the life and/or the load limits of the equipment in a relative short period of time compared to the desired life of the equipment.

In an aspect of the invention, said climate controlling means are at least one climate-box enclosing said equipment or at least a part of said equipment.

Substantially enclosing the equipment or at least a part of the equipment by a climate-box provides for a relatively simple and inexpensive way of establishing a controlled environment around the equipment. Furthermore a climate-box substantially enclosing the equipment would also have the side effect of being sound absorbing, hereby reducing the noise emitted form the test bench.

In an aspect of the invention, said simulating means comprises means for positioning said equipment in a defined angle in relation to a horizontal plane at least during said test, said defined angle being different from 0°.

Rotor on large modern wind turbines are for different reasons angled so that the rotor plane is not perpendicular to the ground. This causes that the drive train in most wind turbines are positioned in an angle perpendicular to the rotor plane and therefore not parallel with the horizontal plane of the ground. Since the drive train and the drive train components are very essential component of a wind turbine it would be advantageous to test these components on a test bench and in particular on a test bench which could test the equipment in an angle different from 0° in relation to a horizontal plane.

In an aspect of the invention, said defined angle corresponds to a normal operation angle of said equipment e.g. the angle of a nacelle in relation to a tower.

This is advantageous, in that it hereby is possible to provide for a test bench capable of performing a more efficient and/or realistic test.

In an aspect of the invention, said test bench comprise a monitoring system monitoring said equipment and/or said test bench during said test.

The equipment is tested for among other reasons to extract important information of the equipment such as the equipments life, durability, efficiency and general capacity and quality. It is therefore advantageous to provide the test bench with a monitoring system for gathering these or other information to be used for analysing the tested equipment.

In an aspect of the invention, said one or more load applying means comprise rotation resisting means for offering resistance to rotational movement of one or more output shafts of a gearbox of said equipment.

By providing the test bench with rotation resisting means, it is possible to offer more (or less) resistance to the rotation of the output shaft of a tested gearbox, than the generator—that the specific type of gearbox would normally be connected to in an operating wind turbine—would be able to inflict. This is advantageous, in that it hereby is possible to provide the test bench with load applying means capable of applying not only normal operational loads to a tested gearbox but also extreme, accidental or other kinds of loads that the normal generator either would not be able to inflict or would be severely damaged by inflicting.

In an aspect of the invention, said rotation resisting means comprise a test bench generator of said test bench.

Providing the test bench with a generator for resisting the rotation of the at least one output shaft of a tested gearbox is advantageous, in that the energy produced by any equipment trying to resist the rotation of a wind turbine gearbox in an overload situation would be considerable and most feasible mechanical systems would convert this energy to heat, hereby making it more difficult to make the test efficient and/or realistic. By using a generator it is possible to convert the majority of this energy back to electric power which advantageously could be lead back to a utility grid.

In an aspect of the invention, said test bench generator of said test bench being connected to a utility grid or utility grid simulating means.

If the test bench generator is connected to a utility grid it is possible to simulate normal operation of the gearbox and it provides means for getting rid of the produced energy and if the generator is connected to utility grid simulating means it is furthermore possible to simulate different, special, fault or abnormal modes of the utility grid. This is advantageous in that it hereby is possible to perform a more realistic and/or efficient test.

In an aspect of the invention, said one or more load applying means apply load to said input shaft and/or to an output shaft of said equipment.

Wind turbine equipment which comprises rotating parts are in real operating situations substantially mainly affected by load on either their input or output shaft or both. It is therefore advantageous to provide the loads on these shafts in a test situation to provide for a more realistic and/or efficient test.

In an aspect of the invention, said simulating means comprise means for mounting wind turbine components through its real suspension structure.

By testing the wind turbine components while they are mounted or suspended in the suspension structure, in which they would be mounted or suspended in in a real wind turbine, it is possible to perform a much more realistic and/or efficient test in that, besides the fact that the suspension structure itself can be tested under realistic circumstances, it also enables that the test of the wind turbine components becomes more realistic and that the interaction between specific combinations and/or designs of suspension structures and components can be tested.

The invention further provides for a method for testing wind turbine equipment. The method comprises the steps of positioning the equipment in, on or at a test bench, rotating an input shaft of the equipment by drive means of the test bench, and directly and/or indirectly applying load to the equipment by means of load applying means of the test bench.

By rotating an input shaft of the equipment while stressing the equipment by at the same time applying load to the equipment is advantageous, in that it hereby is possible to perform a more efficient and/or realistic test.

In an aspect of the invention, load is applied to said equipment by connecting a generator of said equipment to a utility grid or utility grid simulating means.

In an aspect of the invention, the grid voltage and the grid frequency of said utility grid simulating means can be dynamically adjusted during said test.

In an aspect of the invention, axial and/or radial load is applied to an input shaft of said equipment during the test.

In an aspect of the invention, one or more climate parameters such as the temperature, humidity and air pressure of the surroundings of at least a part of said equipment is controlled during the test.

In an aspect of the invention, said equipment is positioned in a defined angle in relation to a horizontal plane at least during said test, said defined angle being different from 0°.

In an aspect of the invention, said angle being stationery or dynamically adjustable during said test.

In an aspect of the invention, said angle is established to substantially correspond to a normal operation angle of said equipment e.g. the angle of a drive train in a nacelle in relation to a tower.

In an aspect of the invention, said equipment and/or said test bench is monitored by a monitoring system during the test.

In an aspect of the invention, said method further comprise the step of resisting rotational movement of one or more output shafts of a gearbox of said equipment.

In an aspect of the invention, said test also tests the suspension structure of said equipment and/or the interaction between one or more wind turbine components and said suspension structure.

In an aspect of the invention, said method further comprise the step of establishing wind turbine like conditions or facilities by way of simulating means.

BRIEF DESCRIPTION OF THE DRAWINGS

The invention will be described in the following with reference to the figures in which.

DETAILED DESCRIPTION OF THE INVENTION

Figure 1:
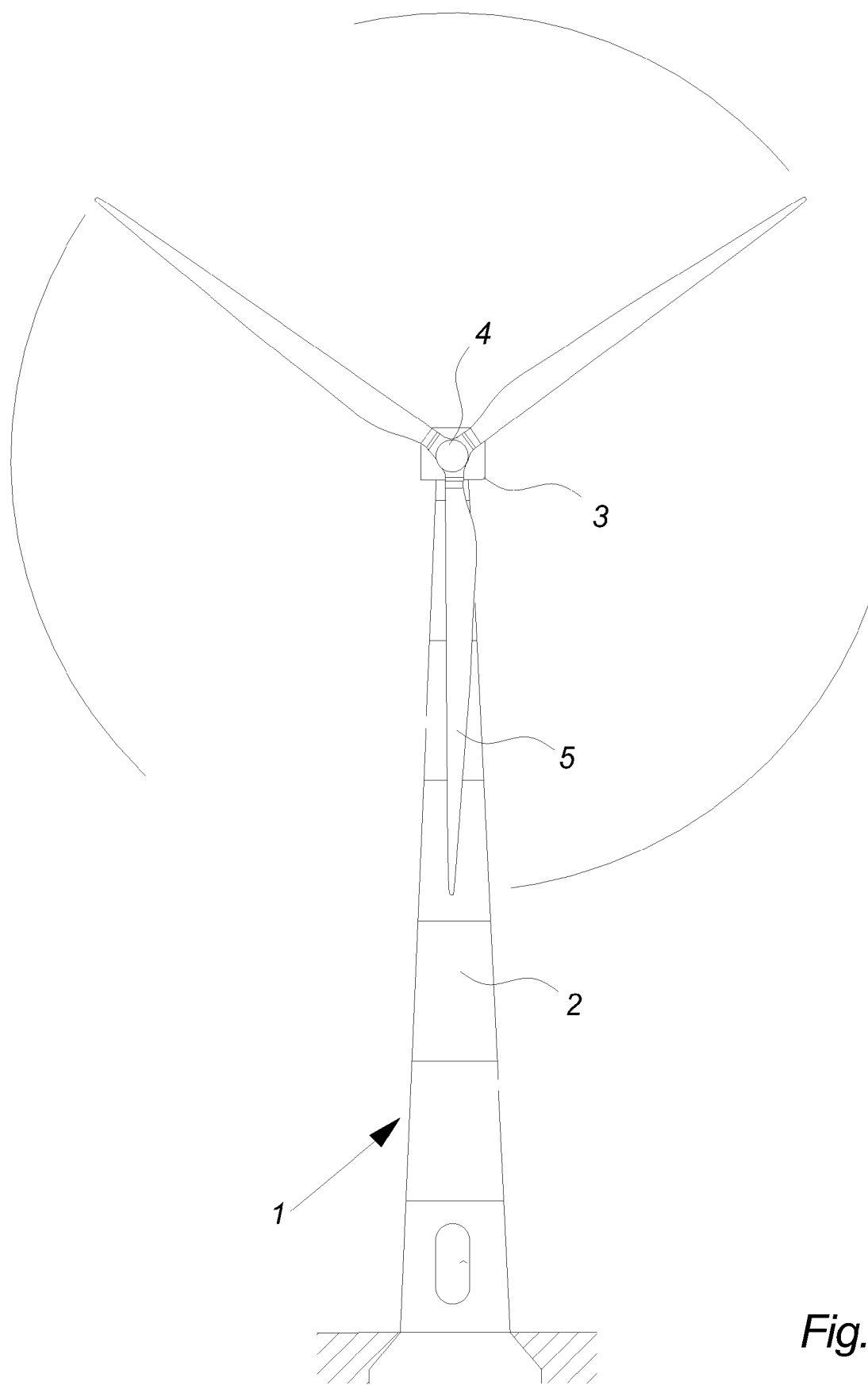
FIG. 1 illustrates a large modern wind turbine known in the art, as seen from the front.

FIG. 1 illustrates a modern wind turbine 1, comprising a tower 2 placed on a foundation and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
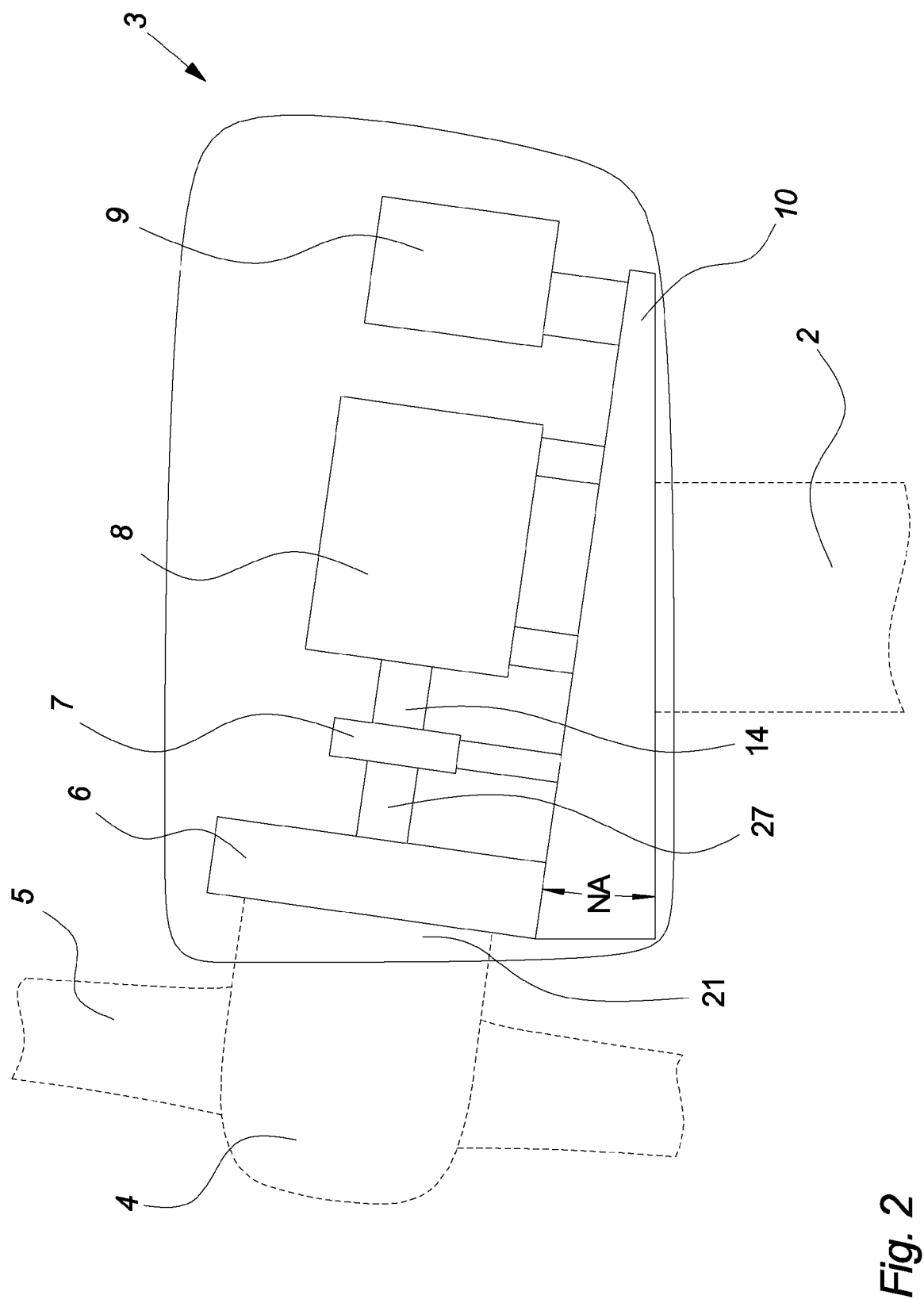
FIG. 2 illustrates a cross section of an embodiment of a simplified nacelle known in the art, as seen from the side.

FIG. 2 illustrates a simplified cross section of a nacelle 3, as seen from the side. Nacelles 3 exists in a multitude of variations and configurations but in most cases the drive train 14 in the nacelle 3 almost always comprise one or more of the following components: a gearbox 6, a coupling (not shown), some sort of breaking system 7 and a generator 8. A nacelle 3 of a modern wind turbine 1 can also include a converter 9 (also called an inverter) and additional peripheral equipment such as further power handling equipment, control cabinets, hydraulic systems, cooling systems and more.

The weight of the entire nacelle 3 including the nacelle components 6, 7, 8, 9 is carried by a load carrying structure 10. The components 6, 7, 8, 9 are usually placed on and/or connected to this common load carrying structure 10. In this simplified embodiment the load carrying structure 10 only extends along the bottom of the nacelle 3 e.g. in form of a bed frame to which some or all the components 6, 7, 8, 9 are connected. In another embodiment the load carrying structure 10 could comprise a gear bell 11 transferring the load of the rotor 4 to the tower 2, or the load carrying structure 10 could comprise several interconnected parts such as latticework.

In this embodiment of the invention the drive train 14 is established in a normal operation angle NA of 8° in relation to a plane perpendicular to the tower 2, a centre axis through the tower 2 and a horizontal plane. The drive trains is for among other reasons angled to enable that the rotor 4 can be angled correspondingly e.g. to ensure that the blades 5 do not hit the tower 2, to compensate for the differences in wind speed at the top and bottom of the rotor 4 and other.

Figure 3:
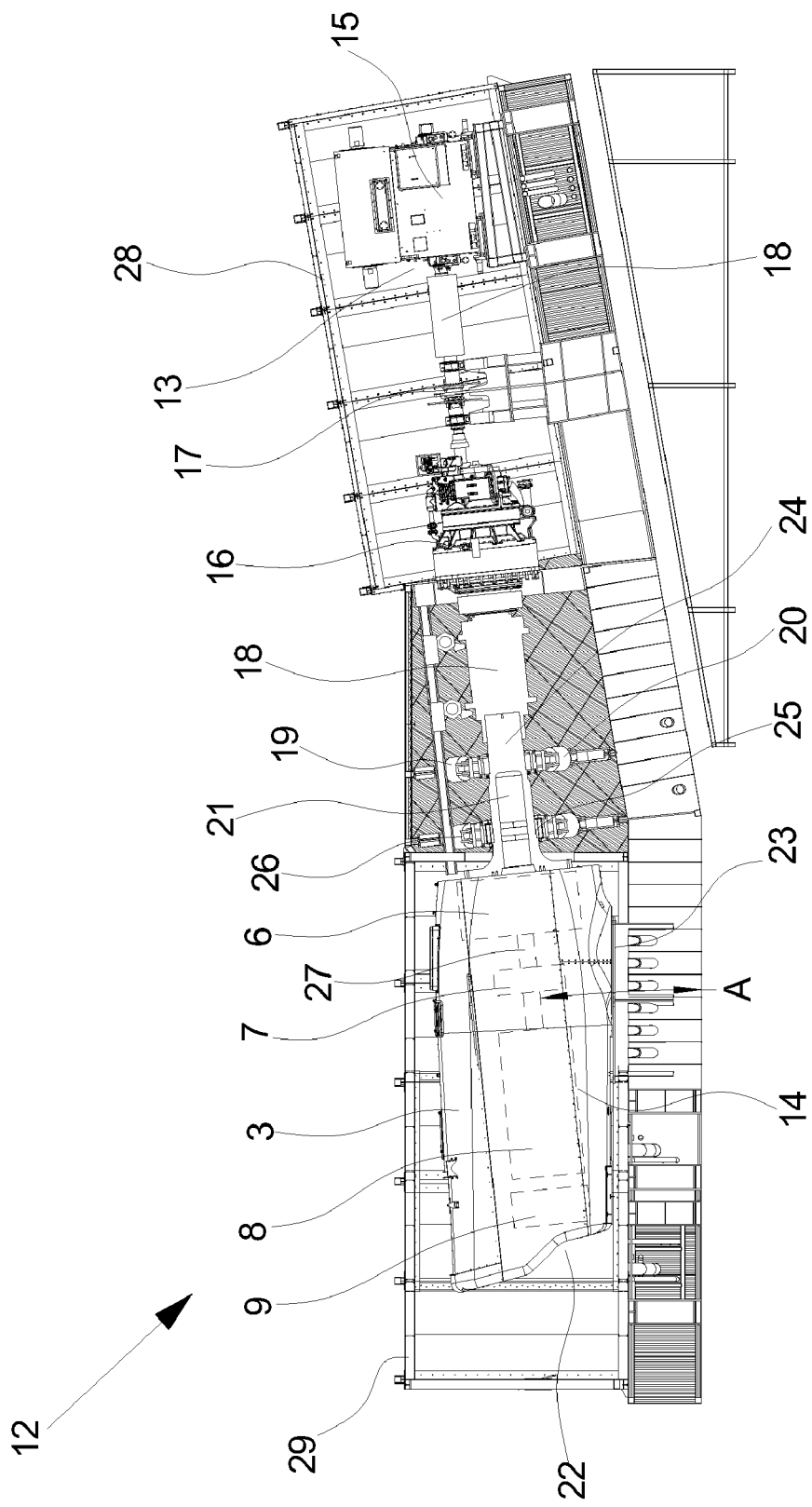
FIG. 3 illustrates a partial cross-section of a test bench testing a wind turbine nacelle, as seen from the side.

FIG. 3 illustrates a partial cross-section of a test bench 12 testing a wind turbine nacelle 3, as seen from the side.

In this embodiment of the invention the test bench 12 comprise drive means 12 in the form of an electric motor 15 and a gearbox 16 wherein between a braking system 17 is positioned.

The output shaft of the test bench gearbox 16 is connected to a flexible coupling 18 of the test bench 12, which is connected to load applying means of the test bench 12 in the form of radial load means 20, which will be described more thoroughly under the description of FIG. 4.

The radial load means 20 comprising a shaft adapter 24 is connected to an input shaft 21 of a nacelle 3, which in this case is the input shaft 21 of a wind turbine gearbox 6, which via a brake system 7 and coupling (not shown) is connected to a generator 8 inside the nacelle 3. In this embodiment the nacelle 3 further comprise a converter 9.

In this embodiment the wind turbine equipment 22—in form of the drive train components 6, 7, 8 in the nacelle 3—is positioned in an angle A of 6° in relation to a horizontal plane, in that the tower connection flange 23 of the nacelle 3 is rigidly connected to a substantially horizontal connection flange of the test bench 12. Since the nacelle 3 in real life would be connected to a substantially horizontal connection flange at the top of a wind turbine tower 2, this angle A corresponds to the angle NA of these specific drive train components 6, 7, 8, 9 when positioned in an ordinary operating wind turbine 1.

In another embodiment of the invention the connection flange of the test bench 12 could be angled in relation to a horizontal plane or the entire test bench 12 could be angled or comprise means for controlling the angle of the bench 12 and/or the equipment 22.

In another embodiment of the invention the connection flange of the test bench 12 could also comprise means for providing load to the equipment e.g. some sort of load applying means 19 applying loads to a yaw mechanism (not shown) of a wind turbine 1, the load carrying structure 10 of a nacelle 3 or the input shaft 21 if the tested equipment 22 or for in any other way to apply load to the tested equipment 22 e.g. to increase the efficiency and/or realism of the test.

In this embodiment of the invention the radial load means 20 are at least in principle the only load applying means 19 of the test bench 12 applying direct load to the input shaft 21 of the equipment 22 but in another embodiment the test bench 12 could comprise further load applying means 19 for applying load to the input shaft 21 of the equipment 22 or any other part of the equipment 22 in any other feasible direction such as axial, diagonally or from varying directions. Particularly axial loads could be interesting in that all operating wind turbines 1 has to be able to handle a significant axial load from wind load on the rotor 4.

In this embodiment of the invention the generator 8 in the nacelle 3 is connected to grid simulating means enabling that the generator 8 during the test indirectly can act as a load applying mean of the test bench 12, in that it is possible to simulate different grid situations such as extreme overload situations, fault situations short circuits, asymmetric phase amplitude and angle or other either independently or co-operating or other. The different situations of the grid will thereby through the generator 8 indirectly apply different load situations on the tested equipment 22.

In another embodiment the generator 8 could simply be connected to the utility grid in the same way as it would be in an operating wind turbine 1.

In this embodiment of the invention the test bench 12 comprise noise reducing means 28 in the form of a sound absorbing box 28 substantially enclosing the drive means 13 of the test bench 12, hereby enabling that the noise produced by particularly the drive means 13 are absorbed by the box 28, hereby reducing the noise emission from the test bench 12.

In another embodiment the entire test bench 12 could be enclosed by a sound absorbing box 28 or the individual parts of the test bench 12 producing noise could be individually equipped with noise reducing means 28. In this embodiment the noise reducing means 28 are passive but in another embodiment the means 28 could be active e.g. by providing noise in antifase or other.

In this embodiment of the invention the test bench 12 further comprises simulating means in the form of climate controlling means 29. The climate controlling means 29 are provided by means of a climate box 29 substantially enclosing the wind turbine equipment 22 or at least a part of the equipment 22 to be tested on the bench 12.

In this embodiment the climate box 29 enables that the temperature inside the box 29 can be adjusted and controlled freely between −45° and 55° Celsius when the equipment 22 is inactive and not operating and between −40° and 90° Celsius during operation of the equipment 22. These temperature ranges are in the present embodiment of the invention sufficient to provide an efficient and/or realistic environment for the tested equipment 22 but in another embodiment the bench 12 could comprise means for controlling the ambient temperature of the equipment 22 within different ranges and the climate controlling means 29 could further comprise means for controlling other climate parameters such the humidity and/or the air pressure.

Figure 4:
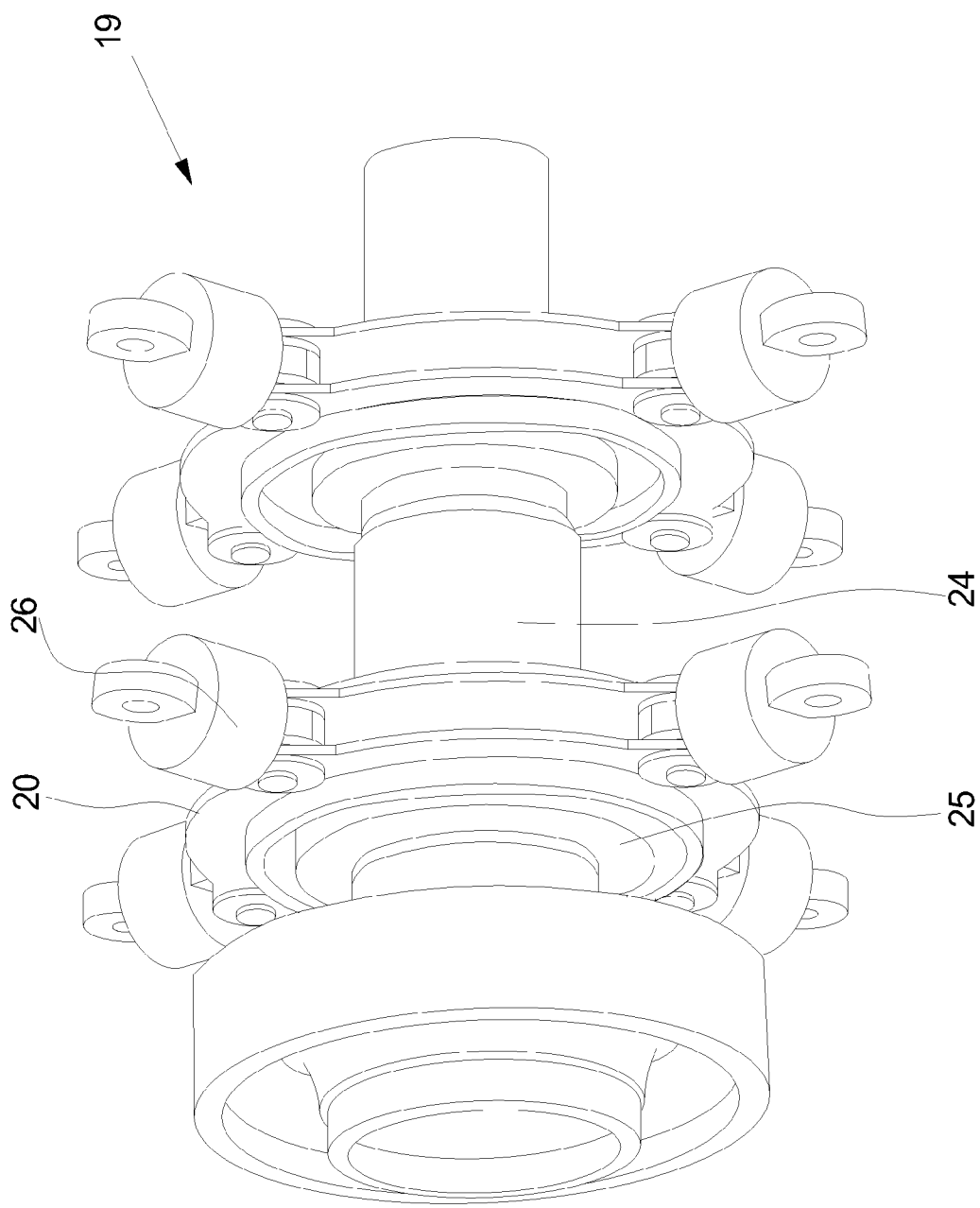
FIG. 4 illustrates an embodiment of load applying means, as seen in perspective.

FIG. 4 illustrates an embodiment of load applying means 19, as seen in perspective.

In this embodiment of the invention the load applying means 19 are formed as two radial load means 20 axially displaced on a shaft adapter 24 made to fit e.g. the input shaft 21 of the nacelle gearbox 6 or the input shaft of other wind turbine equipment 22.

Each of the radial load means 20 comprise a large radial load bearing 25 comprising a inner ring connected to the shaft adapter 24 or balls or roller running directly on the outer surface of the shaft adapter 24 and an outer ring to which four evenly spaced linear actuators 26 are attached.

In this embodiment the linear actuators 26 are four hydraulic cylinders 26 with an inner cylinder diameter of 350 millimeters and a outer diameter of the piston rod of 120 millimeters operating a an oil pressure of 175 bars, but in another embodiment the cylinders could of course be sized differently. In another embodiment the linear actuators 26 could also be motor driven spindles, pneumatic cylinders or other.

In another embodiment the radial load means 20 could comprise another number of linear actuators 26 such as one, two, three or more and the linear actuators 26 could placed and spaced differently.

The linear actuators 26 are in the other end rigidly connected to a substantially rigid structure of the test bench 12 enabling that when the linear actuators 26 are extending or retracting this load is transferred substantially fully to the input shaft 21 on which the shaft adapter 24 is mounted or connected to.

The hydraulic cylinders 26 could be connected individually to e.g. proportional valves or servo controlled valves making it possible to control the load inflicted by each of the cylinders 26 individually.

In another embodiment of the invention the shaft adaptor 24 could comprise only one radial load means 20 or more than two radial load means 20 and the radial load means could act directly on the input shaft 21 of the nacelle 3, directly on the main shaft, the low speed shaft and/or the high speed shaft or on the input and/or output shaft 21, 27 of other wind turbine equipment such as generator, gearbox, brake system couplings or other.

Figure 5:
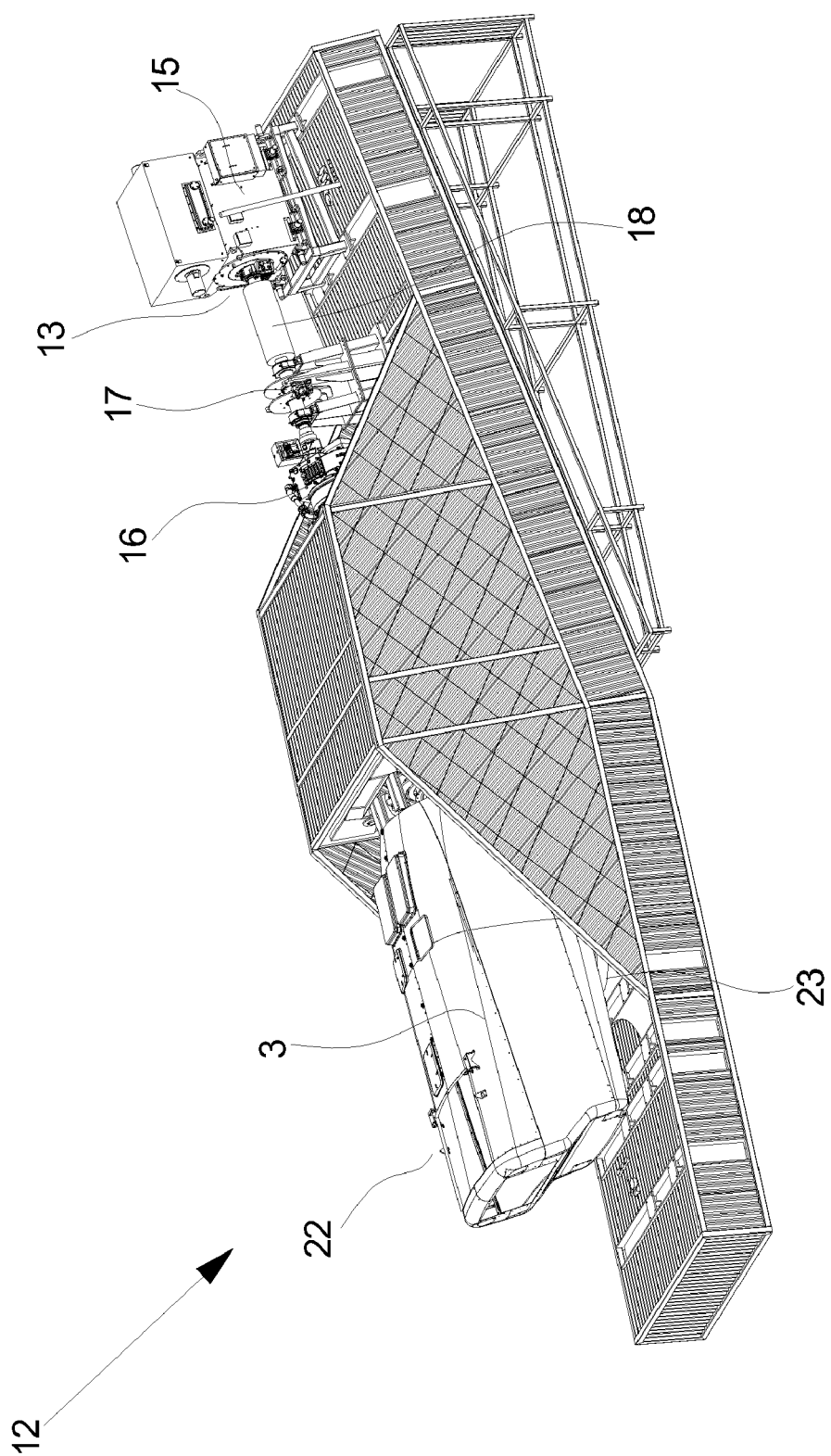
FIG. 5 illustrates an embodiment of a test bench testing a nacelle, as seen in perspective.

FIG. 5 illustrates an embodiment of a test bench 12 testing a nacelle 3, as seen in perspective.

In this embodiment of the invention the carrying structure of the test bench 12 is made of a mostly welded latticework of steel tubes or beams wherein between a number of strengthening members in form of trapezium profiled plates are welded. Trapezium profiled plates are plates formed as a straight part followed by two e.g. 45° bends in opposite directions and then another straight part displaced from the first, then two 45° again and so on. By providing the open areas of the latticework with these profiled plates the carrying structure of the test bench 12 becomes very strong and rigid.

In another embodiment of the invention the carrying structure of the test bench 12 could be made in a multitude of different way such as a structure mainly connected by fastening means such as bolt, screws or rivets, it could be partly or completely moulded in cast-iron or concrete, it could be any combination of the above mentioned techniques or any other technique which would ensure that the test bench 12 was rigid enough to transfer the desired loads in the desired amounts at the desired locations satisfactory to ensure that the test results are as reliable as possible.

In this embodiment of the invention the carrying structure of the test bench 12 comprise a structure substantially surrounding the link between the wind turbine equipment and the test equipment of the test bench, particularly the radial load means 20. This is done to provide a strong and rigid structure for the radial load means 20 to be suspended in. In another embodiment this suspension of the radial load means 20 could of course be done in a multitude of different way such as an independent suspension frame rigidly connected to the rest of the test bench 12 or other.

In this embodiment of the invention the carrying structure of the test bench 12 further comprise a number of vibration damping means in form of rubber plates strategically placed between the steel tubes of the carrying structure of the test bench 12 and by providing the connection points or points of support to the ground with vibration dampening means substantially preventing any vibration of the test bench 12 from being transmitted to the ground.

In another embodiment of the invention the test bench 12 could comprise other kinds of vibration dampening means such as active dampening means, by providing the test bench 12 with vibration dampening liquid reservoirs, by providing the bench 12 with strategically placed shock absorbers or other.

Figure 6:
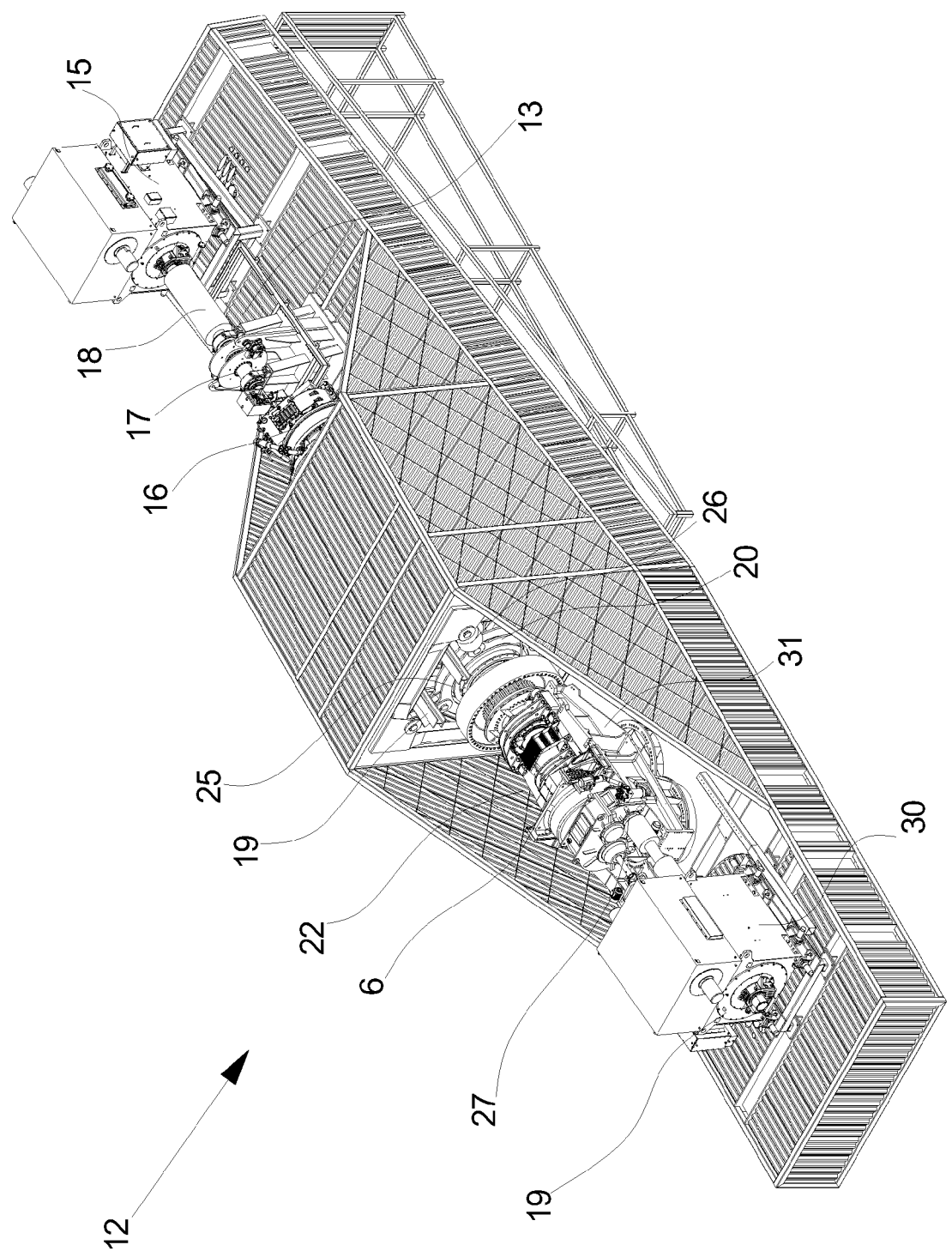
FIG. 6 illustrates a test bench performing a gearbox test, as seen in perspective.

FIG. 6 illustrates a test bench 12 performing a gearbox test, as seen in perspective.

In this embodiment of the invention wind turbine like facilities is established in that this embodiment of a wind turbine gearbox 6 is rigidly connected to the connection flange of the test bench 12 via its original suspension structure 31. By testing the gearbox 6 (and all other wind turbine equipment 22 for that matter) suspended in its original and real suspension structure 31 it is possible to also test the suspension structure 31 of the equipment 31 during the test. Furthermore by establishing these wind turbine-like facilities the interaction between the specific wind turbine component (6, 7, 8, 9) and its real suspension structure 31 can be tested and the illustrated gear 6 can thereby be tested under very realistic conditions.

In another embodiment the simulating means could comprise vibration damping suspension or mounting devices, external structures or frames for providing additional rigidity or any other form of structure or device in or though which the wind turbine components 6, 7, 8, 9 would be mounted in a real wind turbine, hereby enabling that the wind turbine equipment 22 could be tested more realistic and/or efficient.

In this embodiment the suspension structure 31 further comprise the main bearing of the nacelle 3 making it possible to test this or these bearings in an efficient and/or realistic way.

The input shaft 21 of the gearbox 6 is connected to the drive means 13 and directly or indirectly to the radial load means 20 and the output shaft 27 of the gearbox is connected to a generator 30 of the test bench 12.

By controlling the generator 30 it is possible to apply a load to the output shaft 27 which would attempt to resist the rotation of the shaft 27 hereby making it possible to e.g. inflict extreme overloads, fault situations or other situations on the gearbox which would not easily be simulated otherwise.

Figure 7:
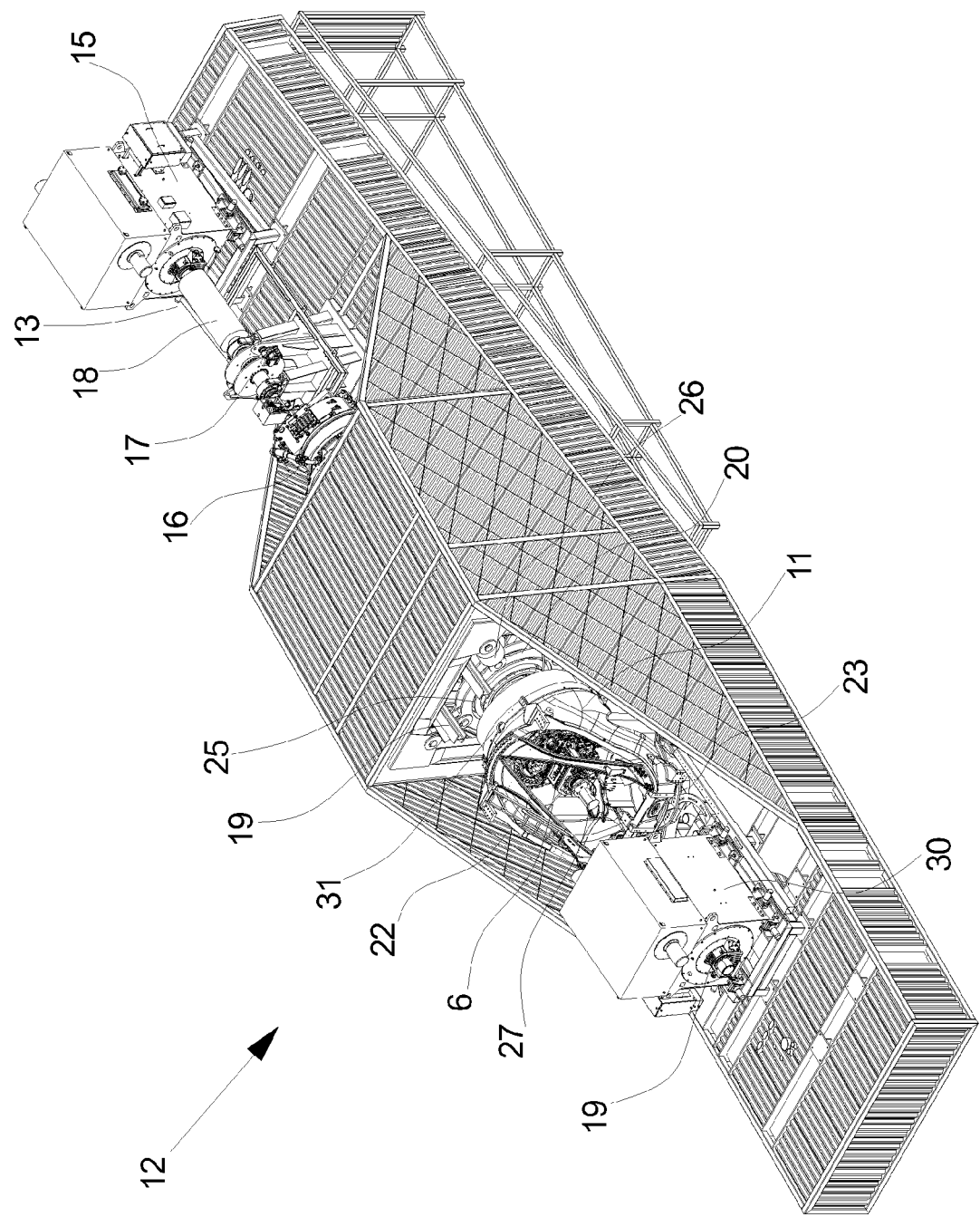
FIG. 7 illustrates a test bench performing a gearbox test on another embodiment of a wind turbine gearbox, as seen in perspective.

FIG. 7 illustrates a test bench 12 performing a gearbox test on another embodiment of a wind turbine gearbox 6, as seen in perspective.

In this embodiment of the invention another embodiment of a wind turbine gearbox 6 is rigidly connected to the connection flange of the test bench 12 via its original suspension structure 31, which in this embodiment comprise a gear bell 11. The gearbox 6 is in this embodiment an epicyclic gearbox where the input shaft 21 in principle is constituted by the planet carrier of the gearbox. In this embodiment the main bearing of the nacelle 3 is incorporated in the gearbox 6 and thereby also tested in a gearbox 6 test.

In this embodiment the coupling means connecting the output shaft 27 of the gearbox 6 and the input shaft of the test bench generator 30 is removed hereby revealing the output shaft 27 of the gearbox 6 and in this embodiment the gearbox 6 only comprise one output shaft 27 but in another embodiment the gearbox 6 could comprise two output shafts 27 or even more e.g. for being connected to two or more separate generators 8 in the wind turbine nacelle 3.

Figure 8:
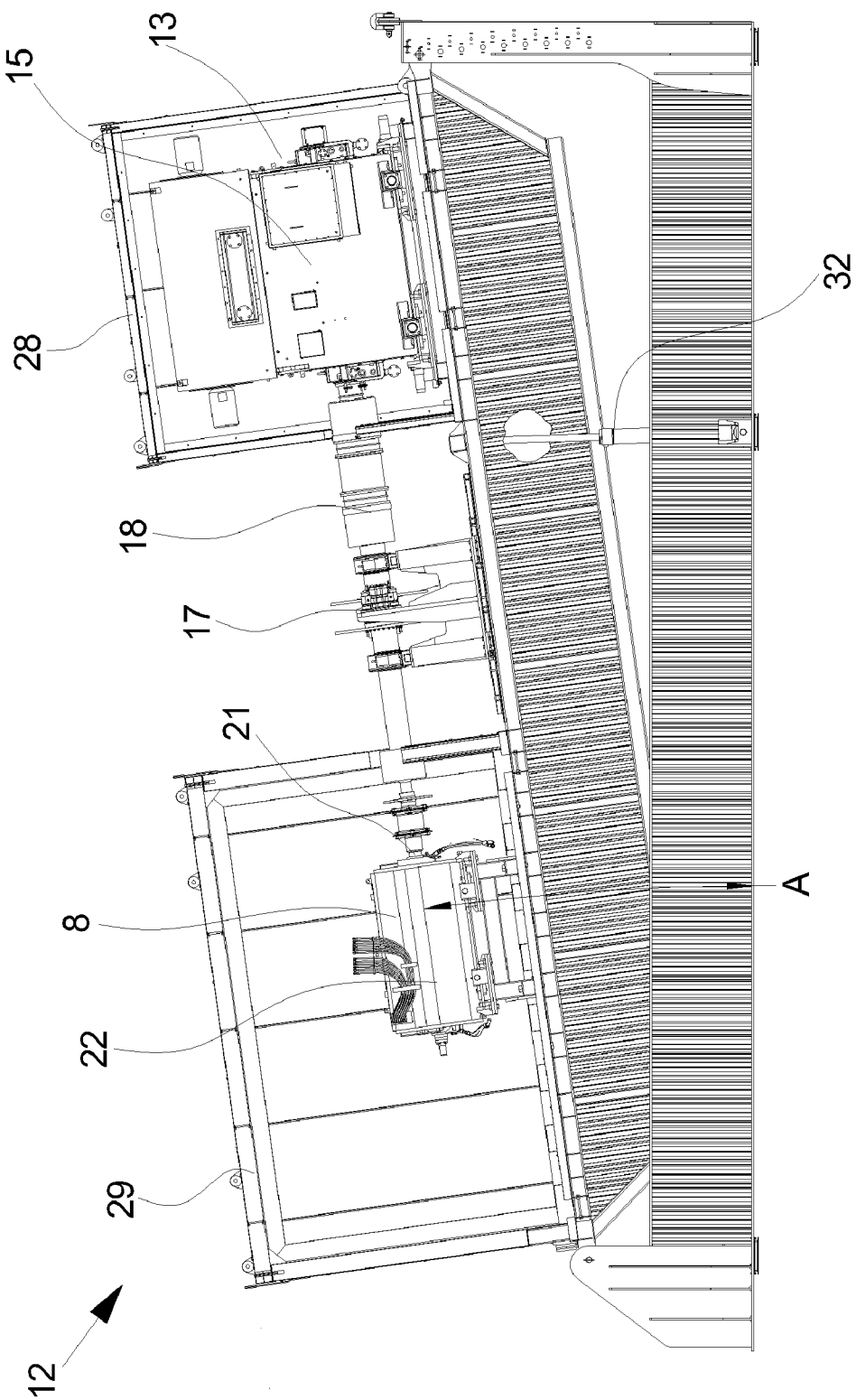
FIG. 8 illustrates another embodiment of a test bench testing a wind turbine generator, as seen from the side.

FIG. 8 illustrates another embodiment of a test bench 12 testing a wind turbine generator 8, as seen from the side.

In this embodiment the test bench 12 is configured to test a wind turbine generator 8. Since a generator 6 is made to produce power optimally at substantially the same rotation speed as the nominal rotation speed of most electrical motors 15 the drive means 13 of this test bench 12 does not comprise a gearbox 16, making the output shaft of the test bench motor 15 being more or less directly coupled to the input shaft 21 of the generator 8 through a coupling 18 and a braking system 17 of the test bench 12.

Since the generator 8 is tested without the load carrying structure 10 which would define its orientation in a nacelle, the test bench 12 is in this embodiment provided with simulating means in the form of tilting means 32, enabling that wind turbine like conditions can be established in that the generator can be tested in an angle A corresponding to its angle NA in relation to a horizontal plane when mounted in an operating wind turbine 1.

In this embodiment the generator 8 is connected to grid simulating means applying an indirect load to the input shaft 21 of the generator 8, in that when connected to these grid simulating means it is possible to simulate different situations where the generator produce power making the rotor of the generator 8 resist rotation and thereby apply load to the input shaft 21.

In another embodiment the bench 12 could also be provided with other load applying means 19 such as means applying substantially axial load to the input shaft 21 of the generator 8.

The invention has been exemplified above with reference to specific examples of test benches 12, wind turbine equipment 22, load applying means 19 and other. However, it should be understood that the invention is not limited to the particular examples described above but may be designed and altered in a multitude of varieties within the scope of the invention as specified in the claims.

What is claimed is:

1. A test bench for testing wind turbine equipment, said test bench comprising one or more load applying means applying load to said equipment by at least one of direct and indirect application, drive means of said test bench for rotating at least one of an input shaft of a wind turbine gearbox and an input shaft of a wind turbine generator at least during a part of the test, and simulating means for establishing wind turbine like conditions or facilities.

2. The test bench according to claim 1, wherein said equipment are wind turbine drive train components, and wherein said generator being connected to a utility grid or utility grid simulating means.

3. The test bench according to claim 2, wherein said utility grid or utility grid simulating means being an indirect load applying mean of said test bench.

4. The test bench according to claim 2, wherein said utility grid simulating means comprise means for testing if said equipment complies with different utility grid codes.

5. The test bench according to claim 1, wherein at least one of said one or more load applying means comprise means for applying at least one of axial and radial load to said input shaft.

6. The test bench according to claim 1, wherein said one or more load applying means comprise two or more radial load means for applying substantially radial load to said input shaft, said two or more radial load means being axially displaced.

7. The test bench according to claim 1, wherein said simulating means comprise climate controlling means for substantially controlling one or more climate parameters of the surroundings of at least a part of said equipment.

8. The test bench according to claim 1, wherein said simulating means comprises means for positioning said equipment in a defined angle in relation to a horizontal plane at least during said test, said defined angle being different from 0°.

9. The test bench according to claim 1, wherein said one or more load applying means comprise rotation resisting means for offering resistance to rotational movement of one or more output shafts of a gearbox of said equipment.

10. The test bench according to claim 9, wherein said rotation resisting means comprise a test bench generator of said test bench.

11. The test bench according to claim 1, wherein said one or more load applying means apply load to at least one of said input shaft and to an output shaft of said equipment.

12. A test bench according to claim 1, wherein said simulating means comprise means for mounting wind turbine components through its real suspension structure.

13. A method for testing wind turbine equipment, said method comprising the steps of positioning said equipment in, on or at a test bench, rotating at least one of an input shaft of a wind turbine gearbox and an input shaft of a wind turbine generator by drive means of said test bench, and applying load to said equipment by means of load applying means of said test bench.

14. The method according to claim 13, wherein load is applied to said equipment by connecting a generator of said equipment to a utility grid or utility grid simulating means.

15. The method according to claim 14, wherein a grid voltage and a grid frequency of said utility grid simulating means are dynamically adjustable during said test.

16. The method according to claim 13, wherein axial and radial load is applied to an input shaft of said equipment during the test.

17. The method according to claim 13, wherein one or more climate parameters of the surroundings of at least a part of said equipment is controlled during the test.

18. The method according to claim 13, wherein said equipment is positioned in a defined angle in relation to a horizontal plane at least during said test, said defined angle being different from 0°.

19. The method according to claim 13, wherein said method further comprises the step of resisting rotational movement of one or more output shafts of a gearbox of said equipment.

20. The method according to claim 13, wherein said test also tests at least one of a suspension structure of said equipment and an interaction between one or more wind turbine components and said suspension structure.

* * * * *